W. L. DYSART AND C. H. LANIUS.
AUTO TIRE SCOPE.
APPLICATION FILED JULY 19, 1919.

1,338,615.

Patented Apr. 27, 1920.

Inventors.
W. L. Dysart and
C. H. Lanius.
by Wilkinson & Giusta
Attorneys.

W. L. DYSART AND C. H. LANIUS.
AUTO TIRE SCOPE.
APPLICATION FILED JULY 19, 1919.

1,338,615.

Patented Apr. 27, 1920.
2 SHEETS—SHEET 2.

Inventors.
W. L. Dysart and
C. H. Lanius.
by Wilkinson & Giusta.
Attorneys.

UNITED STATES PATENT OFFICE.

WILLIAM L. DYSART AND CHARLES HENRY LANIUS, OF HARLOWTON, MONTANA.

AUTO-TIRE SCOPE.

1,338,615.  Specification of Letters Patent.  Patented Apr. 27, 1920.

Application filed July 19, 1919. Serial No. 312,068.

*To all whom it may concern:*

Be it known that we, WILLIAM L. DYSART and CHARLES HENRY LANIUS, citizens of the United States, both residing at Harlowton, in the county of Meagher and State of Montana, have invented certain new and useful Improvements in Auto-Tire Scopes; and we do hereby declare the following to be a full, clear, and exact description of the invention, such as will enable others skilled in the art to which it appertains to make and use the same.

The present invention relates to improvements in automobile attachments, and consists more particularly in an improved device for showing the condition of inflation of the tires to the occupant of the driver's seat in the vehicle.

It is an object of the present invention to provide a device for the above described purpose which will be simple in construction and capable of application to the various styles of automobiles.

It is well recognized at the present time that tires should be kept at a given degree of inflation, dependent upon the weight of the car, in order to secure the best results in automobile operation; and it is a further object of the present invention to have the condition of the four tires show on the dash or instrument board of the vehicle so as to be constantly in view of the driver, and the same thus forms a reminder that the tires showing a condition of partial deflation should be pumped to the given degree above referred to.

In the accompanying drawings forming a part of this application, and in which similar reference symbols indicate corresponding parts in the several views.

Figure 1:
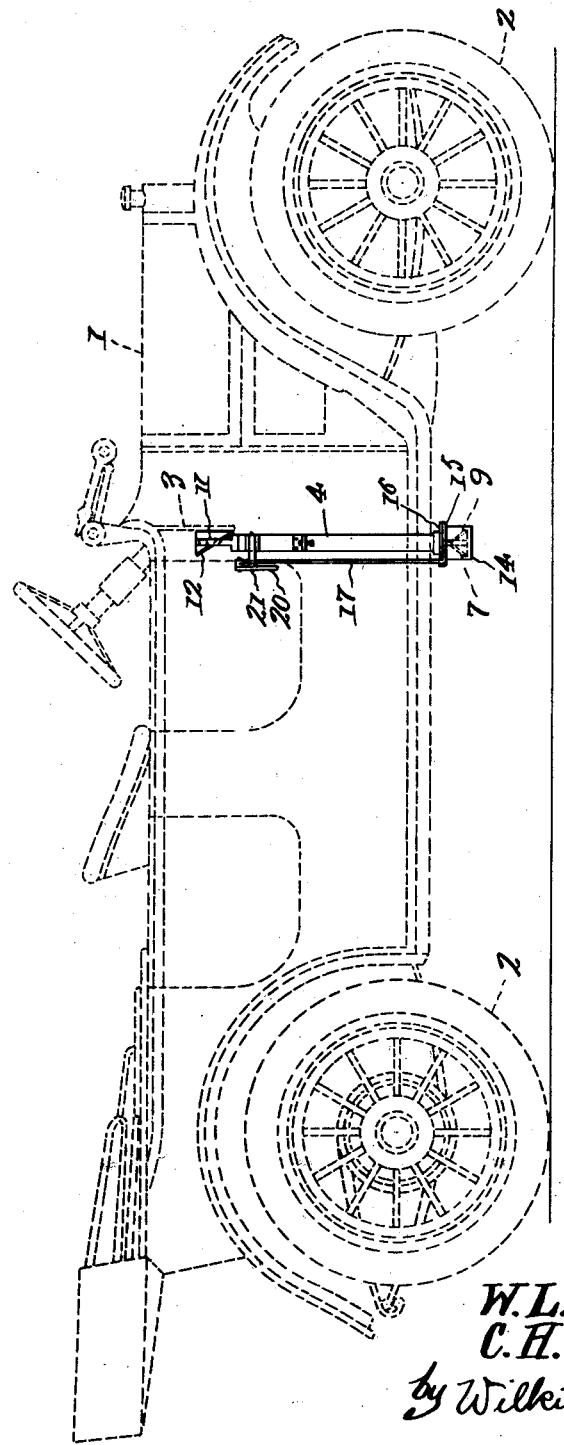
Figure 1 shows an automobile in dotted lines with a tire scope thereon constructed in accordance with the present invention.

Referring more particularly to the drawings, in Fig. 1 there is indicated at 1 an automobile or other vehicle using pneumatic tires 2, and 3 indicates the dash or instrument board of the vehicle.

The improved device consists of a tube that passes through the floor of the automobile and carries reflectors or mirrors at the lower end for reflecting the bases of the various tires up through the tube, which latter is provided at its upper end with a recording reflector adapted to receive the rays passing up through the tube from the lower mirrors and reflect such rays so that same may be seen by the occupants of the vehicle.

Figure 2:
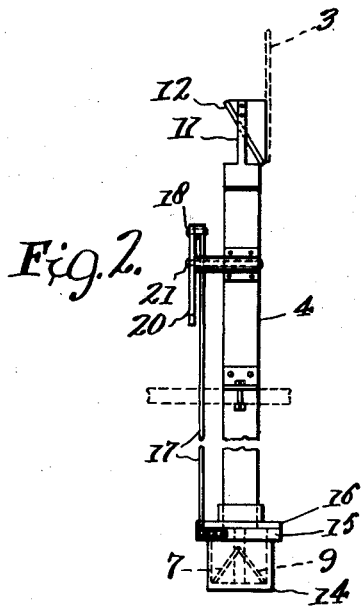
Fig. 2 is an enlarged view showing the improved device in side elevation.
Figure 4:
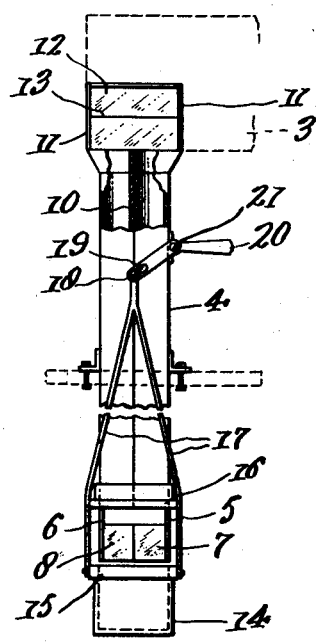
Fig. 4 is a similar view, with parts shown in section and with the shield open.

The tube is indicated at 4, and is shown in Fig. 1 to pass vertically through the floor of the automobile and to be provided at its lower end with hangers or brackets 5 and 6 carrying a pair of rear mirrors 7 and 8 shown in Fig. 4, and a pair of front mirrors 9, one of which is shown in Figs. 1 and 2.

These various mirrors or reflectors are held by the brackets 5 and 6 below the lower end of the tube 4, and in such position and at the proper angles to reflect the bases of the four tires 2 of the vehicle. For instance, the mirror or reflector 7 shown in Fig. 4 and indicated in Figs. 1 and 2, is so placed and arranged that it will reflect the base of the right rear tire; while the other mirror 8 is so placed and arranged that it will reflect the base of the left rear tire of the vehicle. In like manner the two front mirrors or reflectors 9 are so positioned and arranged that they will, respectively, reflect the bases of the right and left front tires.

The various mirrors referred to are also so set and arranged that the reflected rays from the tire bases will ascend vertically up through the tube 4, and this tube 4 is preferably provided with a partition 10 to divide the same in accordance with the size of the mirrors or reflectors in order that the rays may not interfere with one another or become confused in the tube; or, if desired, two tubes 4 may be employed and placed side by side, respectively, above the several mirrors.

Brackets 11 on the upper end of the tube 4 carry a recording mirror or reflector 12 arranged on the dash or instrument board 3, and so placed and arranged at such an angle above the tube 4 as to intercept the vertically ascending rays at substantially a right angle into the vehicle, where the same may be observed by the occupants.

Figure 3:
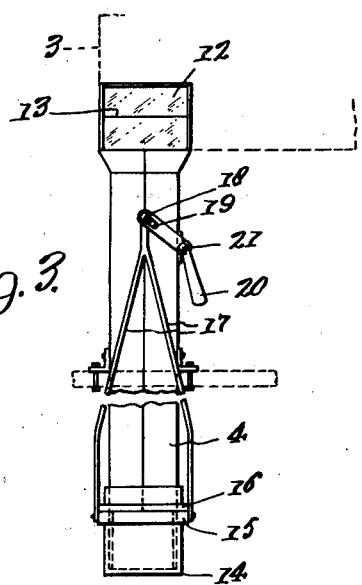
Fig. 3 is a front view of the improved device with the reflector shield in closed position.

As indicated in Fig. 3, the recording reflector 12 may be divided by a horizontal line 13 so as to separate the two images of the front tire bases from the images of the rear tire bases, and if found desirable or necessary a vertical partition line might also be laid off on the recording reflector 12 in order to separate the images of the right and left tires.

Referring to Fig. 4, the image of the left rear tire would be reflected from the mirror 8 to the upper left hand portion of the recording reflector 12; while the image of the base of the right rear tire would be reflected from the mirror 7 to the right hand upper portion of the recording reflector 12 above the division line 13. In similar manner the images of the front tires, transmitted from the two front mirrors 9, would be seen, respectively, at the right and left lower portions of the recording reflector 12 below the line 13, so that each tire has its image reflected on the recording reflector 12 in clear view of the operator, who may thus be informed as to what tires, if any, have become deflated.

The shield 14, of a cup-like construction, is adapted to normally fit over the mirrors 7, 8 and 9, as shown in Figs. 1, 2 and 3, so as to protect these various mirrors from dust, which would otherwise accumulate on same and prevent the proper transmission of the images to the recording reflector 12.

A flange 15 on the shield 14 is adapted to strike a shoulder 16 on the lower end of the tube 4 in order to form a stop or abutment for the shield when the same is in the raised or closed position.

The shield 14 is carried by arms 17, being merged at their upper ends where they carry a pin 18 loosely fitting in a slot 19 in one end of the bell crank lever 20, fulcrumed as indicated at 21 on the tube 4 or steering post of the vehicle. This bell crank lever 20 forms a convenient means, accessible to the driver, for opening and closing the shield 14. The open position of this shield is shown in Fig. 4, the handle of the bell crank lever 20 having been lifted and the shield 14 lowered away from the mirrors so that the images of the tires may now be reflected and registered on the recording reflector 12. After the condition of the tires has been examined in the recording reflector 12, the driver depresses the handle of the bell crank lever 20 and restores the shield 14 to the closed position shown in Figs. 1, 2 and 3.

It is obvious that those skilled in the art may vary the details of construction and arrangements of parts without departing from the spirit of our invention, and therefore we do not wish to be limited to such features except as may be required by the claim.

We claim:

In combination with an automobile having pneumatic tires, of a device for informing occupants in the automobile of the condition of such pneumatic tires including a tube arranged vertically and passing from the interior of the body of the vehicle down through such body and having its lower end exposed beneath the vehicle, a support on the lower end of the tube extending below same, a plurality of diagonally disposed mirrors carried by said support and arranged to reflect images of the base portions of the several tires and transmitting such images up through said tube, partitions in the tube for forming separate paths for the several images, an inclined mirror at the top of the tube within the body of the automobile and observable by an occupant therein and having divided off spaces adapted to receive and reflect the several images of the tire bases transmitted up through said tube, a dust cap adapted to cover the mirrors carried by said support beneath the automobile, a vertically shiftable frame for carrying said dust cap, said frame passing up through the body of the car, and a lever fulcrumed on said tube and connected to said frame, said lever being disposed for operation by the occupant, substantially as described.

W. L. DYSART.
C. HENRY LANIUS.